June 11, 1957    J. KREMSER    2,795,135
DEVICE FOR ADJUSTING THE TENSION OF BELTS
Filed Oct. 6, 1953
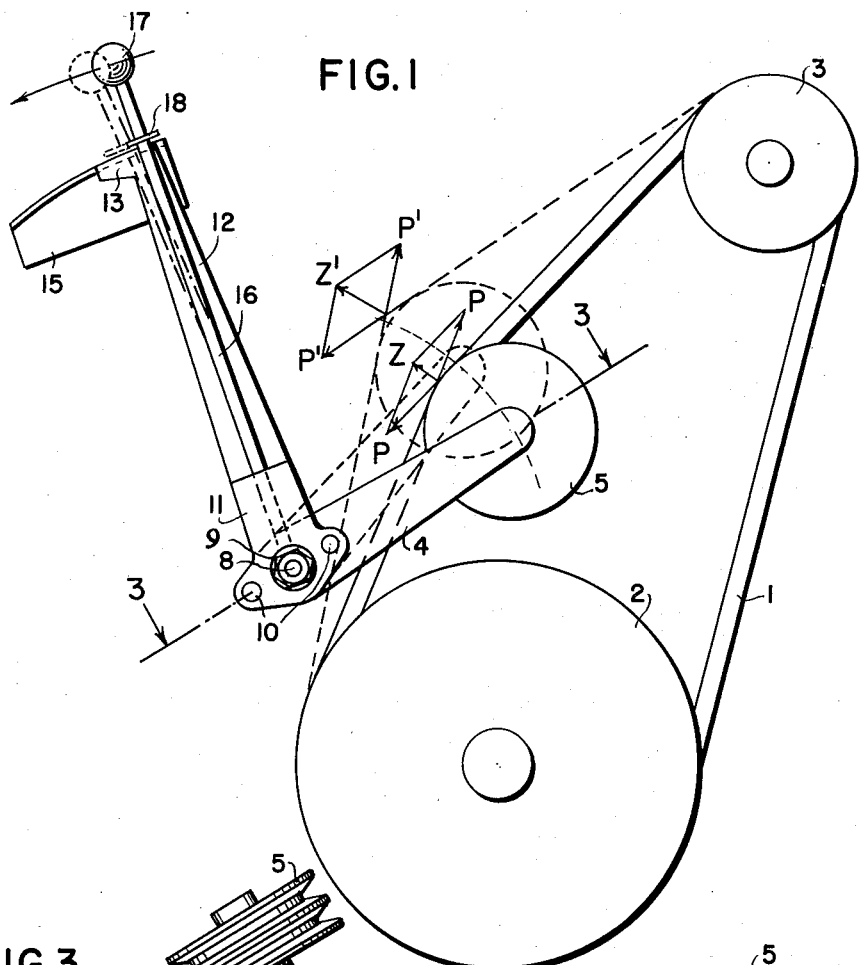
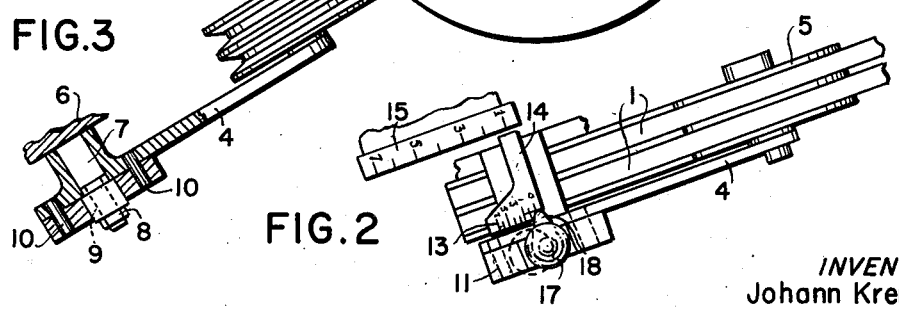
INVENTOR.
Johann Kremser
ATTORNEY

United States Patent Office 2,795,135
Patented June 11, 1957

2,795,135

DEVICE FOR ADJUSTING THE TENSION OF BELTS

Johann Kremser, Hannover, Germany

Application October 6, 1953, Serial No. 384,420

Claims priority, application Germany March 18, 1953

3 Claims. (Cl. 73—144)

This invention relates to a device for adjusting the tension of belts, particularly of V-belts in internal combustion engines where auxiliary elements as, for instance, blowers or the like, are driven by V-belts. As is well known, belt drives are of disadvantage in so far as they expand after a certain time of operation so that a transmission of all the power available is no longer possible because of the reduced tension of the belt. It has been proposed to eliminate this deficiency by employing spring-loaded, weight-loaded, or adjustable tightener pulleys or idlers. The devices known so far, however, left no possibility for the control of the belt tension, and particularly in V-belt drives it was not possible to exactly determine whether the belt was correctly tightened or not.

It is an object of this invention to eliminate the disadvantages of the known devices. According to the invention this is achieved by employing a torque wrench for the adjustment of the idler, the operating capacity of said torque wrench being restricted by means of an indicating device fitted to the lever arm carrying the idler, so that the same tension is obtained when re-adjusting the belt. The position of the lever arm for the idler is fixed in conventional manner by means of nuts, clamps, or the like, while the torque wrench on the indicating device is removable from the lever arm.

It is another object of the present invention to provide a tension adjusting device which includes means to indicate the belt tension by means of a lever arm carrying the idler, which lever arm is provided with a hand which glides in front of a scale fixed to the engine block. The torque wrench is fitted to the base of said hand. The graduation of the scale which is fixedly mounted to the engine block is adapted to the scale of the torque wrench so that the same tension may be reached in any position of the idler by adjusting both scales to the same graduation marks when re-tightening the belt.

With these and other objects in view which will become apparent in the following detailed description, the present invention will be clearly understood in connection with the accompanying drawings, in which Figure 1 is an illustration of a V-belt drive with a tightening device in accordance with the invention;

Fig. 2 is a top view on Fig. 1; and

Fig. 3 is a sectional view taken on a line 3—3 through the arrangement according to Fig. 1.

In the embodiment according to Fig. 1 the V-belts 1 pass over belt pulleys 2 and 3. The tension of said belts is adjustable by means of an idler 5 mounted to a lever arm 4. Said arm 4, carrying said idler is pivotally arranged on a shaft 7 in the engine block 6, and may be fixed in any position by means of the nut 8.

In order to be able to mount the device in accordance with the invention a roller 9 is fitted to the shaft 7. Furthermore, bores have been provided in the arm 4, around its pivoting point, to receive pins 10 which are arranged at the base 11 of the device. Said base 11 has an extension arm 12 which at its upper end carries a scale segment 13 which at the same time forms a laterally extending hand 14. Said hand 14 moves in the region of a scale 15 fixedly mounted to the engine block.

Parallel to the arm 12 a spring-rod 16 forming the torque wrench is fitted to the base 11, said rod 16 having a handle 17 and a hand 18 at its free end. A graduation is provided on the segment 13 which co-operates with the scale 15. Both graduations differ from each other.

Adjustment of the belt is as follows: In order to produce a tension P the idler 5 has to apply a pull Z on the belt. If the belt has stretched it is necessary to apply a much greater pull Z' to achieve the same tension P'. The tightening device is mounted to the roller 9 of the arm 4 to enable an adjustment to the increased pull. The pins 10 thereby fit into the bores provided in the arm 4. After loosening the nut 8 the handle 17 of the torque wrench is moved in the direction of the arrow as shown in Fig. 1. The arm 4 with the arm 12 is moved at the same time. The hand 14 points to a certain mark on scale 15. If both scales are gauged the correct belt tension is reached when the hand 18 of the torque wrench points to the same mark on scale 13 as the hand 14 on scale 15. It is important that both scales are calibrated so that the necessary physical laws for the belt tension are taken into consideration.

When the correct belt tension is reached, i. e. after both scales are in accordance with each other the nut 8 is tightened again, whereby the idler arm 4 is fixed in the adjusted position. The tightening device may now be removed and used for other purposes.

While I have disclosed one embodiment of the present invention, it is to be understood that this embodiment is given by example only and not in a limiting sense, the scope of the present invention being determined by the claims.

I claim:

1. A device for adjusting the tension of a belt, comprising a lever arm turnably mounted adjacent said belt, an idler engaging the said belt and turnably mounted on one end of the said lever arm, means for locking the said lever arm in a predetermined, belt tensioning position, an indicating device secured to said arm for reading the required position of the said lever arm and a torque wrench supplied with a second indicator and connected with the said lever arm, a housing carrying a first scale in position to co-operate with said first indicating device and said first indicating device carrying a second scale in position to co-operate with said second indicator, the said scales being so calibrated that the proper degree of tension is reached when said indicators show the same reading.

2. The device, as set forth in claim 1, in which the said torque wrench is removably connected with the said lever arm.

3. A device for adjusting the tension of a belt, comprising a lever arm turnably mounted adjacent said belt, an idler engaging the said belt and turnably mounted on one end of the said lever arm, means for locking the said lever arm in a predetermined, belt tensioning position, an indicating device secured to said arm for reading the position of the said lever arm and a torque wrench connected with the said lever arm for adjusting the latter, said indicating device for the position of the said lever arm being formed by a first indicator rigidly connected with the said lever arm and a housing carrying a first scale, and the said torque wrench being formed by a resilient beam, by which the torsional forces are transmitted to the said lever arm, the said beam being supplied with a second indicator and a second scale on the said first indicator, the said both scales being so calibrated, that the proper degree of tension is reached, when the said both indicators show the same reading.

References Cited in the file of this patent

UNITED STATES PATENTS

| | | |
|---|---|---|
| 1,822,935 | Reeves | Sept. 15, 1931 |
| 2,401,876 | Marker | June 11, 1946 |
| 2,404,029 | Birk | July 16, 1946 |
| 2,475,426 | Ewaldson | July 5, 1949 |

FOREIGN PATENTS

| | | |
|---|---|---|
| 506,284 | France | May 26, 1920 |
| 622,951 | Germany | Dec. 12, 1935 |